United States Patent
Fresco

(10) Patent No.: US 9,256,083 B2
(45) Date of Patent: Feb. 9, 2016

(54) MULTI-FOCAL LENS

(71) Applicant: Ocular Technology Inc., Toronto (CA)

(72) Inventor: Bernard Fresco, Toronto (CA)

(73) Assignee: Ocular Technology Inc., Toronto, ON (CA)

( * ) Notice: Subject to any disclaimer, the term of this patent is extended or adjusted under 35 U.S.C. 154(b) by 0 days.

(21) Appl. No.: 14/346,928

(22) PCT Filed: Sep. 24, 2012

(86) PCT No.: PCT/CA2012/000891
§ 371 (c)(1),
(2) Date: Mar. 24, 2014

(87) PCT Pub. No.: WO2013/040695
PCT Pub. Date: Mar. 28, 2013

(65) Prior Publication Data
US 2014/0226125 A1    Aug. 14, 2014

Related U.S. Application Data

(60) Provisional application No. 61/537,669, filed on Sep. 22, 2011.

(51) Int. Cl.
*G02C 7/00* (2006.01)
*G02C 7/06* (2006.01)

(52) U.S. Cl.
CPC ............. *G02C 7/061* (2013.01); *G02C 7/066* (2013.01)

(58) Field of Classification Search
CPC .... B29D 11/00826; G02C 7/04; G02C 7/061; G02C 7/065
USPC ................ 351/159.01, 159.4, 159.42, 159.73
See application file for complete search history.

(56) References Cited

U.S. PATENT DOCUMENTS

| 1,414,117 | A | 4/1922 | Drescher |
| 4,062,629 | A | 12/1977 | Winthrop |
| 4,426,139 | A | 1/1984 | van Ligten et al. |

(Continued)

FOREIGN PATENT DOCUMENTS

| CA | 1135544 A1 | 11/1982 |
| CA | 1149208 A1 | 7/1983 |

(Continued)

OTHER PUBLICATIONS

Obrig, Theo E., 'Modem Ophthalmic Lenses and Optical Glasses' 1944, pp. 187, the Chilton Company, New York.

(Continued)

*Primary Examiner* — James Greece
(74) *Attorney, Agent, or Firm* — Millman IP Inc.

(57) ABSTRACT

In one aspect, the invention is directed to a multifocal ophthalmic lens having a first region having first focal properties, and a second region having second focal properties and including a progressive region. The second region may further include, for example, a portion that is a reading region. The second region has two side edges and there are first and second transition regions between the first region and the side edges of the second region. The transition regions each have a width that is less than a selected width. This gives the lens designer more freedom to provide a wider second region without extending into lower left and lower right regions of the lens.

19 Claims, 4 Drawing Sheets

(56) References Cited

U.S. PATENT DOCUMENTS

| | | |
|---|---|---|
| 4,806,010 A | 2/1989 | Ewer et al. |
| 5,048,945 A | 9/1991 | Ueno et al. |
| 5,110,199 A | 5/1992 | Ishida |
| 5,294,293 A | 3/1994 | Jones |
| 5,305,028 A | 4/1994 | Okano |
| 5,455,642 A | 10/1995 | Kato |
| 5,506,630 A | 4/1996 | Ueno et al. |
| 5,812,237 A | 9/1998 | Roddy |
| 5,918,968 A | 7/1999 | Choi |
| 6,102,544 A | 8/2000 | Baudart et al. |
| 6,231,184 B1 | 5/2001 | Menezes et al. |
| 6,827,441 B2 | 12/2004 | Fresco |
| 2008/0246914 A1 | 10/2008 | Carimalo et al. |

FOREIGN PATENT DOCUMENTS

| | | | |
|---|---|---|---|
| CA | 2477436 A1 | | 8/2003 |
| CA | 2779675 A1 | * | 5/2011 |
| DE | 2644510 A | | 4/1977 |
| EP | 0225034 A1 | | 6/1987 |
| FR | 2419254 A | | 10/1979 |

OTHER PUBLICATIONS

Varilux Infinity brochure, p. 3.
PCT/CA2012/000891, International Search Report, Dec. 31, 2012.
EP12833094, Supplementary European Search Report, Apr. 21, 2015.

* cited by examiner

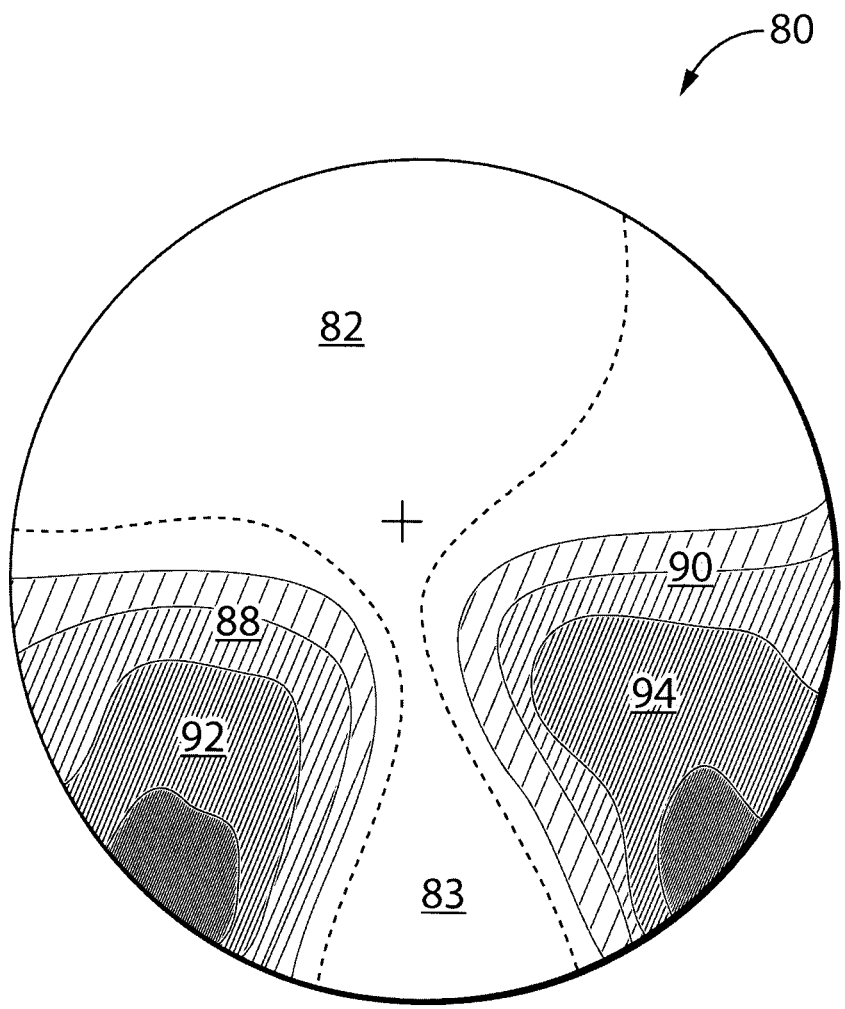
(PRIOR ART) FIG.4

MULTI-FOCAL LENS

CROSS-REFERENCE TO RELATED APPLICATIONS

This application claims the benefit of U.S. Provisional Patent Application No. 61/537,669, filed Sep. 22, 2011, which is hereby incorporated by reference in its entirety.

FIELD

In some aspects, the present invention relates to multi-focal lenses and more particularly to progressive lenses.

BACKGROUND

Multi-focal lenses are well known. The lenses typically include upper regions designed to improve long-distance vision, and lower regions designed to improve intermediate and short distance vision. Such lenses typically have a significant amount of distortion associated with them, particularly in regions of the lens that can cause visual difficulties for the wearer. Additionally, such lenses typically have relatively small reading regions, rendering them difficult to use for reading.

It would be advantageous to provide a lens that at least somewhat addresses one or more of these problems.

Furthermore, it would be advantageous to be able to provide a lens that has at least somewhat less distortion but that is also tailored to permit the wearer to perform a particular task.

SUMMARY

In one aspect, the invention is directed to a multifocal ophthalmic lens having a first region having first focal properties, and a second region having second focal properties and including a progressive region. The second region may further include, for example, a portion that is a reading region. The second region has two side edges and there are first and second transition regions between the first region and the side edges of the second region. The transition regions each have a width that is less than a selected width. This gives the lens designer more freedom to provide a wider second region without extending into lower left and lower right regions of the lens.

Optionally, the lens may further include a third region having third focal properties and including a second progressive region. The third region includes a long-distance viewing portion having a third focal distance that is longer than the first focal distance.

BRIEF DESCRIPTION OF THE DRAWINGS

Reference is made to the attached drawings, in which:

FIG. 4 is an elevation view of a multifocal ophthalmic lens in accordance with the prior art.

DETAILED DESCRIPTION

Figure 1:
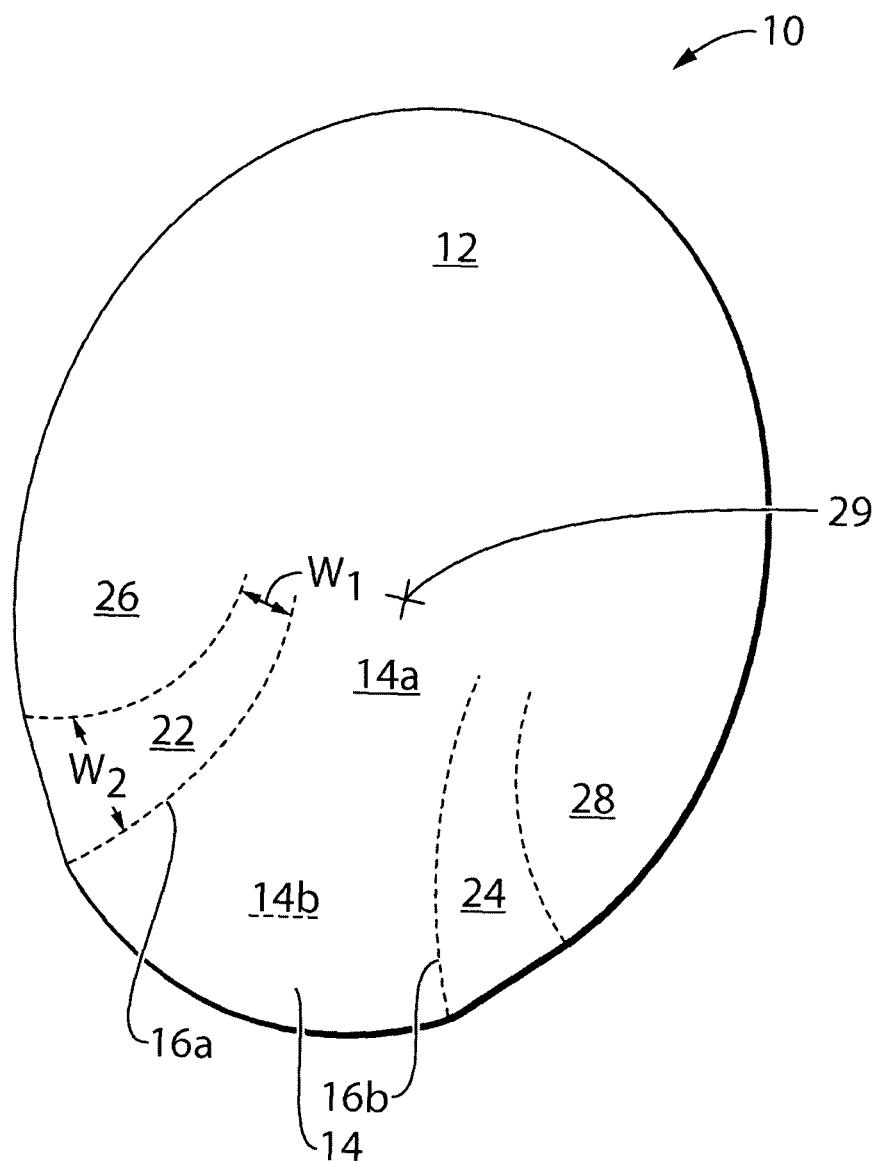
FIG. 1 is a perspective view of a multifocal ophthalmic lens in accordance with an embodiment of the present invention.

Reference is made to FIG. 4, which shows a lens 80 in accordance with the prior art. The lens 80 may be a progressive lens, such that it has a long-distance focus region 82, and a second region 83, which may include a progressive region and a short-distance focus region (for use when reading). In such a lens, the traditional approach to transitioning between the second region 83 and the long-distance region 82 has been to blend gradually. The transition regions that result from this design methodology can be seen as shaded areas 88 and 90 in FIG. 4. These transition regions 88 and 90 unfortunately are areas of distortion in the lens 80, and it can be seen that these regions 88 and 90 occupy a significant region of the swept area of the lens 80. In particular, a result of this design methodology, there is distortion in lower left and lower right regions of the lens 80, which are shown at 92 and 94 respectively. The distortion in these regions 92 and 94 in particular can cause visual difficulty for the wearer of the lens 80. For some wearers, this visual difficulty might cause discomfort and headaches.

Reference is first made to FIG. 1, which shows a multifocal lens 10 made in accordance with an embodiment of the present invention. The lens 10 is for use in eyewear, such as eyeglasses or monocles and the like, providing the wearer with improved vision at selected ranges of focal distance, with little distortion.

The lens 10 comprises a first region 12, which has first focal properties and a second region 14 which has second focal properties. In the particular lens shown, the first focal properties are substantially constant throughout the first region. The first region 12 may, for example, be configured for focus at long-distance.

The second focal properties (i.e. the focal properties of the second region 14) may vary. More particularly, the second region 14 includes a portion that is a progressive region 14a and portion that is a short-distance focus region 14b (which may be referred to as a reading region 14b). The reading region 14b has an associated focal distance that is suitable for reading, such as, for example, approximately 12 inches, although other focal distances are alternatively possible. The progressive region 14a has associated therewith a focal distance that varies progressively between the focal distance of the reading region 14b and the focal distance of the first lens region 12. It will be noted that there is no discontinuity in the lens 10 at the upper and lower limits of the progressive region; the lens surface at the upper end of the progressive region 14a transitions smoothly from the surface of the first region 12, and the lens surface at the lower end of the progressive region 14a transitions smoothly to the surface of the reading region 14b.

The progressive region 14a begins below the optical center 29. The progressive region 14a may be relatively short, such that the progression is relatively fast from the focal distance of the first lens region 12 to the focal distance of the reading region 14b, thereby providing a relatively tall reading region 14b. Alternatively, the progressive region 14a may be more gradual (and therefore taller) thereby providing a reading region 14a that is relatively short.

Figure 2:
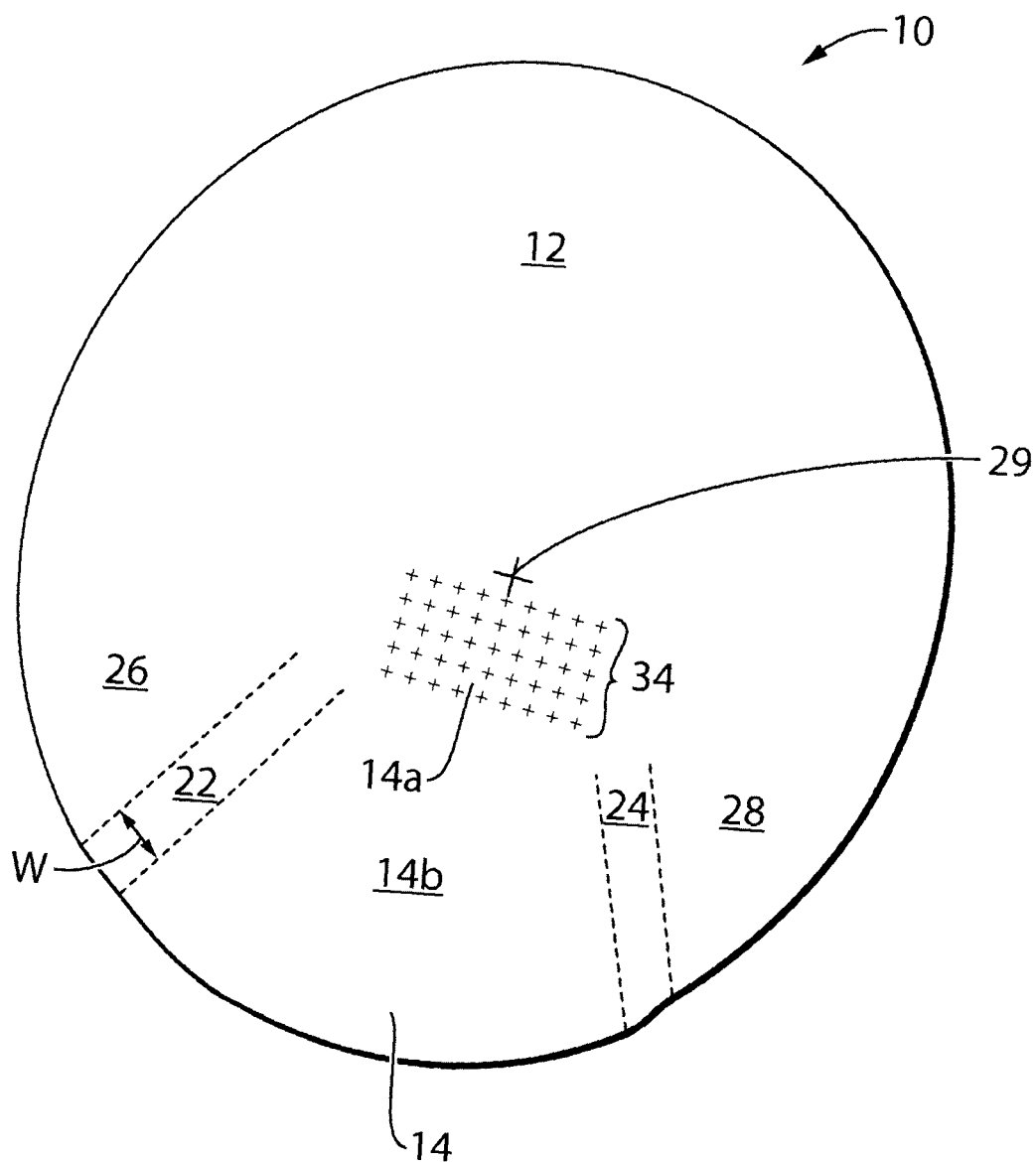
FIG. 2 is a magnified sectional view of a variant of the lens shown in FIG. 1.

The second lens region 14 has a first side edge 16a and a second side edge 16b. The first and second side edges 16a and 16b may be curved, as shown in FIG. 1, or they may be generally straight, as shown in FIG. 2. It can be seen that the width of the second region 14 increases in the downward direction on the lens 10. The lens 10 further includes a first transition region 22 between the first side edge 16a and the first lens region 12, and a second transition region 24 between the second side edge 16b and the first lens region 12. It can be seen that the transition regions 22 and 24 are generally parallel to the side edges 16a and 16b. For example, as can be seen in FIG. 1, the transition regions 22 and 24 each have a roughly similar arcuate shape to that of the first and second side edges 16a and 16b respectively. Similarly, as shown in FIG. 2, the transition regions 22 and 24 have a generally straight shape that is similar to the generally straight shape of the first and second side edges 16a and 16b respectively. Additionally, the transition regions 22 and 24 may each have a selected width which may be less than a selected value, such as, for example, about 8 mm or in some embodiments less than about 7 mm, for a 70 mm diameter lens. In the embodiment shown in FIG. 2, the width is relatively constant along the transition regions 22 and 24 and is shown at W. In the embodiment shown in FIG. 1, the width of the bottom of the transition region 22 (shown at W1) is larger than the width of the top of the transition region 22 (shown at W2). In this embodiment, the width at all points along the transition region 22 or 24 may be less than the selected value. In such embodiments where the width varies, the transition regions 22 and 24 may have a width at their respective top ends that is less than a different selected value, such as, for example, 3 mm, or even less than 1 mm. Having a particularly narrow width at the upper end of the transition regions is valuable since in some lenses, the bottom portion of the lens (where the width W2 in some instances is at its largest) might not be used in the final lens that ultimately is fitted into a wearer's eyeglass frames.

As a result of providing transition regions that are narrow, the reading region 14b of the lens 10 may be made relatively wide, while at the same time keeping these transition regions out of the lower left and lower right regions of the lens, shown at 26 and 28, which, as noted above are regions of the lens 10 that are important to make distortion-free. As can be seen, the regions 26 and 28 in FIGS. 1 and 2 are substantially entirely located within the first lens region 12, and so there is no distortion in the regions 26 and 28.

In total it will be noted that the transition regions 22 and 24, which make up the total area of the lens 10 that may be considered to have astigmatic distortion, is less than about 25% of the swept area of the lens 10. In some embodiments, they constitute less than about 10% of the swept area of the lens 10.

The progressive region 14a and the area surrounding it (e.g. the upper ends of the transition regions 22 and 24) may have a relatively complex shape, and may be designed using a point cloud (shown at 34) instead of 'building' the complex shape by stitching together simple surfaces. It will be understood that it is possible to design the entirety of the lens 10 using a point cloud.

As shown in FIGS. 1 and 2, the second region 14 of the lens 10 may extend all the way down to the bottom of the lens 10, such that the bottom edge of the second region 14 is a segment of the edge of the lens 10.

Figure 3:
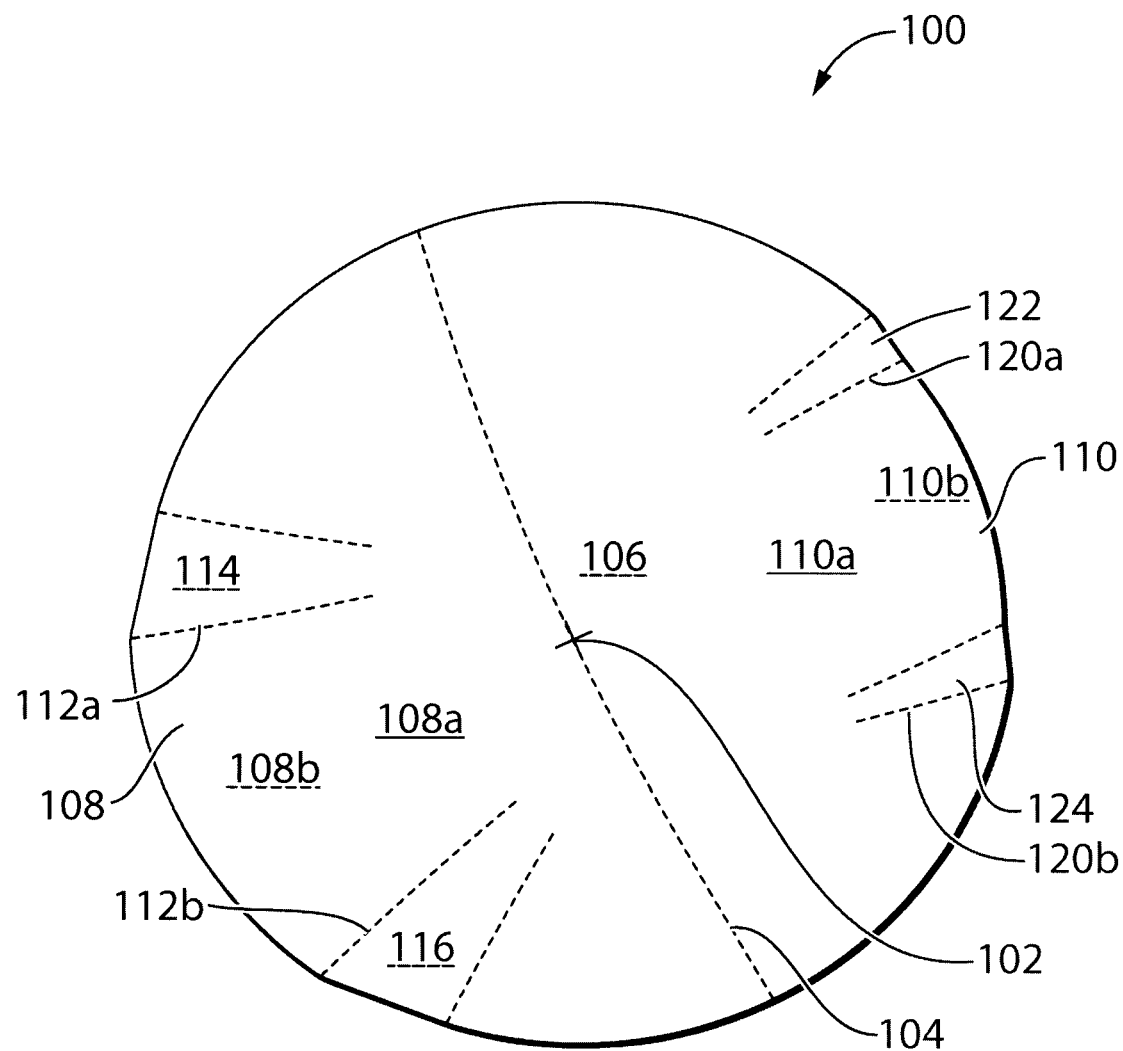
FIG. 3 is a perspective view of a multifocal ophthalmic lens in accordance with another embodiment of the present invention.

Reference is made to FIG. 3, which shows a lens 100 in accordance with another embodiment of the present invention. The lens 100 is shown rotated somewhat. The optical center of the lens 100 is shown at 102. The horizontal primary meridian is shown at 104. The lens 100 has a first lens region 106 having first focal properties, a second lens region 108 having second focal properties and a third lens region 110 having third focal properties. The first lens region 106 may contain the optical center 102 of the lens 100. The first lens region 106 may have substantially constant focal properties throughout, and may have a first focal distance that is selected to be suitable for a particular task. For example, the first lens region may be configured to permit the wearer to view a computer monitor, and may thus have a focal distance of less than, for example, about 30". In another example, the focal distance may be selected to permit a musician to view sheet music while playing their instrument. The first lens region 106 preferably extends across the entire width of the lens 100, as shown.

The second lens region 108 may be similar to the second lens region 14 in FIG. 1 or 2 and may include a progressive region 108a and a reading region 108b. The second lens region 108 has a first side edge 112a and a second side edge 112b. First and second transition regions 114 and 116 transition between the side edges 112a and 112b and the first region 106. The transition regions 114 and 116 may be similar to the transition regions 22 and 24 in FIG. 1 or 2, in that they may be generally parallel to the first and second side edges 112c and 112d respectively, and may each have a width that is less than a selected value.

Above the optical center 102 the third lens region 110 is provided. The third lens region 110 may includes a portion that is a progressive region 110a and a portion that is a long-distance viewing portion 110b. The progressive region 110a has associated therewith a focal distance that varies progressively between the focal distance of the long-distance region 110b and the focal distance of the first lens region 110.

The third lens region 110 has a first side edge 120a and a second side edge 120b. Third and fourth transition regions 122 and 124 extend between the side edges 120a and 120b and the first region 106. The transition regions 122 and 124 may be generally parallel to the first and second side edges 120c and 120d and may have a width that is less than a selected value (which may or may not be the same value as the widths of the transition regions 114 and 116).

It will be noted that the first region 106 generally surrounds the second region about a top edge and the side edges 112a and 112b, and the third region about a bottom edge and the side edges 120a and 120b. Thus, the first region is roughly H-shaped.

The lenses 10 and 100 may be manufactured by any suitable process and may be made from any suitable material. Furthermore, all the lens features (e.g. the features that form the various lens regions may be formed using the front surface of the lens 10 or 100 (i.e. the surface of the lens facing away from the wearer's eye), or using the back surface of the lens 10 or 100 (i.e. the surface of the lens facing the wearer's eye), or a combination of both.

The surfaces of the lens 10 or 100 may have any suitable surface shape. For example, the surfaces of the lens 10 or 100 may be generally spherical, or may be sphero-cylindrical, such that the radius of the lens 10 or 100 may remain substantially constant over a 360 degree angular sweep about the centre of the lens, or alternatively, the radius of the lens 10 or 100 may vary, such that the lens 10 or 100 may have a major axis and a minor axis.

While the above description constitutes a plurality of embodiments of the present invention, it will be appreciated that the present invention is susceptible to further modification and change without departing from the fair meaning of the accompanying claims.

The invention claimed is:

1. A multifocal ophthalmic lens, comprising:
  a first region having first, substantially constant focal properties;
  a progressive region;
  a first transition region between the first region and the progressive region; and
  a second transition region between the first region and the progressive region,
  wherein each transition region is delimited by a first edge that separates the transition region from the first region, and a second edge that separates the transition region from the progressive region, wherein the first and second edges are substantially parallel to one another.

2. A lens as claimed in claim 1, wherein the width of each of the first and second transition regions is less than about 8 mm.

3. A lens as claimed in claim 1, wherein the first and second transition regions each have an upper end and a lower end, and wherein the width of the upper end of each of the first and second transition regions is less than about 3 mm.

4. A lens as claimed in claim 1, wherein the lens contains regions of astigmatic distortion and wherein the regions of astigmatic distortion in total occupy less than 25% of the swept area of the lens.

5. A lens as claimed in claim 1, wherein the progressive region has a width that increases progressively downwardly.

6. A lens as claimed in claim 5, further comprising a reading region below the progressive region.

7. A lens as claimed in claim 6, wherein the first region has a first focal distance, and wherein the reading region has a constant second focal distance that is shorter than the first focal distance.

8. A lens as claimed in claim 1, wherein the first region substantially entirely covers lower left and lower right regions of the lens.

9. A lens as claimed in claim 7, wherein the progressive region is a first progressive region, and wherein the lens further comprises a third region having third focal properties and including a second progressive region, said third region including a long-distance viewing portion having a third focal distance that is longer than the first focal distance.

10. A lens as claimed in claim 9, wherein the first region surrounds a top edge and first and second side edges of the first progressive region, and surrounds a bottom edge and first and second side edges of the third region.

11. A lens as claimed in claim 9, further comprising a third transition region between the first region and a first side edge of the third region; and
   a fourth transition region between the first region and a second side edge of the third region,
   wherein the third and fourth transition regions are substantially parallel to the first and second side edges respectively of the third region and each have a width that is less than a second selected width.

12. A lens as claimed in claim 4, wherein the regions of astigmatic distortion are contained only in the transition regions.

13. A lens as claimed in claim 4, wherein the regions of astigmatic distortion in total occupy less than 10% of the swept area of the lens.

14. A multifocal ophthalmic lens, comprising:
   a first region having first, substantially constant focal properties;
   a reading region having second, substantially constant focal properties;
   a first transition region between the first region and the first side edge of the reading region; and
   a second transition region between the first region and the second side edge of the reading region,
   wherein each transition region is delimited by a first edge that separates the transition region from the first region, and a second edge that separates the transition region from the reading region, wherein the first and second edges are substantially parallel to one another.

15. A lens as claimed in claim 14, further comprising a progressive region immediately adjacent the reading region.

16. A lens as claimed in claim 14, wherein the first region has a first focal distance suitable for long-distance viewing, and wherein the reading region has a portion having a second focal distance that is suitable for use when reading.

17. A lens as claimed in claim 14, wherein the first and second transition regions each have an upper end and a lower end, and wherein the width of the upper end of each of the first and second transition regions is less than about 3 mm.

18. A lens as claimed in claim 14, wherein the first region substantially entirely covers lower left and lower right regions of the lens.

19. A lens as claimed in claim 14, wherein the regions of astigmatic distortion are contained only in the transition regions.

* * * * *